United States Patent
Zhang et al.

(10) Patent No.: US 9,693,295 B2
(45) Date of Patent: Jun. 27, 2017

(54) TERMINAL SELECTION METHOD AND SYSTEM BASED ON SELF-ORGANIZING NETWORK, AND NETWORK ENTITY

(71) Applicant: Huawei Technologies Co., Ltd., Shenzhen, Guangdong (CN)

(72) Inventors: Kai Zhang, Shanghai (CN); Ping Song, Shanghai (CN); Dong Zhao, Shanghai (CN)

(73) Assignee: Huawei Technologies Co., Ltd., Shenzhen (CN)

(*) Notice: Subject to any disclaimer, the term of this patent is extended or adjusted under 35 U.S.C. 154(b) by 179 days.

(21) Appl. No.: 14/611,415

(22) Filed: Feb. 2, 2015

(65) Prior Publication Data
US 2015/0146621 A1 May 28, 2015

Related U.S. Application Data

(63) Continuation of application No. PCT/CN2012/079424, filed on Jul. 31, 2012.

(51) Int. Cl.
*H04W 48/20* (2009.01)
*H04W 24/10* (2009.01)
(Continued)

(52) U.S. Cl.
CPC .......... *H04W 48/20* (2013.01); *H04W 16/18* (2013.01); *H04W 24/10* (2013.01); *H04W 84/18* (2013.01)

(58) Field of Classification Search
CPC ..... H04W 8/005; H04W 16/18; H04W 24/10; H04W 48/20; H04W 84/18
See application file for complete search history.

(56) References Cited

U.S. PATENT DOCUMENTS

2006/0246946 A1 11/2006 Moritomo et al.
2009/0323530 A1* 12/2009 Trigui ................ H04L 41/5025
370/235
(Continued)

FOREIGN PATENT DOCUMENTS

CN  1917422 A   2/2007
CN  101282269 A  10/2008
(Continued)

OTHER PUBLICATIONS

"3rd Generation Partnership Project; Technical Specification Group Services and System Aspects; Telecommunication management; Performance Management (PM); Performance measurements Evolved Universal Terrestrial Radio Access Network (E-UTRAN)(Release 11)", 3GPP TS 32.425 v11.3.0, Jun. 2012, 70 pages.

(Continued)

*Primary Examiner* — Paul H Masur

(57) ABSTRACT

Embodiments of the present invention disclose a SON-based terminal selection method related to the field of communications technologies, where a target terminal is selected pertinently to participate in implementation of a SON algorithm. The method provided by the embodiments of the present invention includes: determining a terminal selection criterion under a requirement of implementing different SON algorithms; and performing target terminal selection from managed terminals according to the terminal selection criterion. A system and a network entity corresponding to the method are also provided. By applying the technical solutions provided by the embodiments of the present invention, a target terminal can be selected pertinently to participate in implementation of the SON algorithm, which avoids waste of resources of terminals that do not need to participate in (Continued)

implementation of the SON algorithm, and improves user experience of these terminals.

15 Claims, 3 Drawing Sheets

(51) Int. Cl.
*H04W 16/18* (2009.01)
*H04W 84/18* (2009.01)

(56) References Cited

U.S. PATENT DOCUMENTS

| | | | |
|---|---|---|---|
| 2011/0045780 A1 | 2/2011 | Ben Hadj Alaya et al. | |
| 2011/0063999 A1 | 3/2011 | Erdmann et al. | |
| 2011/0090820 A1* | 4/2011 | Hussein | H04W 24/02 370/255 |
| 2012/0295609 A1* | 11/2012 | Li | H04W 24/04 455/423 |
| 2012/0320766 A1* | 12/2012 | Sridhar | H04W 24/02 370/252 |
| 2013/0114464 A1* | 5/2013 | Tarraf | H04W 24/02 370/254 |
| 2013/0217435 A1* | 8/2013 | Tarraf | H04W 88/06 455/552.1 |
| 2013/0242736 A1* | 9/2013 | Tarraf | H04W 24/02 370/235 |

FOREIGN PATENT DOCUMENTS

| | | |
|---|---|---|
| CN | 102057731 A | 5/2011 |
| EP | 2 437 540 A1 | 4/2012 |
| WO | WO 2006/063309 A2 | 6/2006 |
| WO | WO 2008/087535 A2 | 7/2008 |
| WO | WO 2009/024695 A2 | 2/2009 |

OTHER PUBLICATIONS

"3rd Generation Partnership Project; Technical Specification Group Services and System Aspects; Telecommunication management; Self-Organizing Networks (SON); Concepts and requirements (Release 11)", 3GPP TS 32.500 v11.1.0, Dec. 2011, 13 pages.

"3rd Generation Partnership Project; Technical Specification Group Services and System Aspects; Telecommunication management; Self-Organizing Networks (SON) Policy Network Resource Model (NRM) Integration Reference Point (IRP); Information Service (IS)(Release 11)", 3GPP TS 32.522 v11.2.0, Jun. 2012, 35 pages.

"Comparison of MDT architectures", Huawei, 3GPP TSG-SA5 (Telecom Management) Meeting SA5#68, Nov. 9-13, 2009, 3 pages.

"Add MDT data collection criteria requirements", Nokia Siemens Networks et al., 3GPP TSG-SA5 (Telecom Management) SA#81, Feb. 6-10, 2012, 4 pages.

\* cited by examiner

1

TERMINAL SELECTION METHOD AND SYSTEM BASED ON SELF-ORGANIZING NETWORK, AND NETWORK ENTITY

CROSS-REFERENCE TO RELATED APPLICATIONS

This application is a continuation of International Application No. PCT/CN2012/079424, filed on Jul. 31, 2012, which is hereby incorporated by reference in its entirety.

TECHNICAL FIELD

The present invention relates to the field of communications technologies, and in particular, to a terminal selection method and system based on a self-organizing network (SON), and a network entity.

BACKGROUND

A SON is introduced to wireless communications systems, to implement automation of network planning and maintenance and to reduce manual operations. In an implementation process of a SON algorithm, a network management system (OAM) or a network element device selects all terminals within its management scope to detect and report parameters required for implementation of the SON algorithm. However, that all terminals participate in the implementation process of the SON algorithm may result in excessive consumption of resources of some terminals that do not need to participate in the implementation of the SON algorithm, or even result in problems such as call interruption, thereby weakening user experience of these terminals.

SUMMARY

Embodiments of the present invention provide a SON-based terminal selection method and system, and a network entity, which can decrease consumption of resources of some terminals that do not need to participate in implementation of a SON algorithm, and avoid occurrence of problems such as call interruption.

According to a first aspect, a terminal selection method based on a self-organizing network SON is provided, including:
  determining a terminal selection criterion under a requirement of implementing different SON algorithms; and
  performing target terminal selection from managed terminals according to the terminal selection criterion.

In a first possible implementation manner, the determining a terminal selection criterion under a requirement of implementing different SON algorithms includes:
  determining the terminal selection criterion according to the requirement of implementing different SON algorithms, and/or according to at least one factor of the following, where the at least one factor includes:
  a terminal priority, a terminal battery remaining power, a terminal processing speed, a terminal moving speed, a terminal capability, a terminal type, a terminal location, a terminal load, a terminal service type, a quality requirement of terminal service, and random selection.

With reference to the first aspect or the first possible implementation manner of the SON-based terminal selection method, in a second possible implementation manner, the requirement of implementing different SON algorithms includes at least one of the following:
  a cell importance degree, an objective fulfillment time limit of a SON algorithm, a cell type, a cell service type, a cell load condition, and an interference-received-by-cell condition.

According to a second aspect, a network entity is provided, including:
  a determining unit, configured to determine a terminal selection criterion under a requirement of implementing different SON algorithms; and
  a selecting unit, configured to perform target terminal selection from managed terminals according to the terminal selection criterion.

In a first possible implementation manner of the network entity, the determining unit is specifically configured to determine the terminal selection criterion according to the requirement of implementing different SON algorithms, and/or according to at least one factor of the following, where the at least one factor includes:
  a terminal priority, a terminal battery remaining power, a terminal processing speed, a terminal moving speed, a terminal capability, a terminal type, a terminal location, a terminal load, a terminal service type, a quality requirement of terminal service, and random selection.

With reference to the second aspect or the first possible implementation manner of the network entity, in a second possible implementation manner, the requirement of implementing different SON algorithms includes at least one of the following: a cell importance degree, an objective fulfillment time limit of a SON algorithm, a cell type, a cell service type, a cell load condition, and an interference-received-by-cell condition.

According to another aspect, a SON-based terminal selection system is provided, including: the foregoing network entity and at least one terminal managed by the network entity.

By applying the technical solutions provided by the embodiments of the present invention, consumption of resources of some terminals that do not need to participate in implementation of a SON algorithm can be decreased and occurrence of problems such as call interruption can be avoided, thereby improving user experience of these terminals.

BRIEF DESCRIPTION OF THE DRAWINGS

To describe the technical solutions in the embodiments of the present invention more clearly, the following briefly introduces the accompanying drawings required for describing the embodiments or the prior art. Apparently, the accompanying drawings in the following description show merely some embodiments of the present invention, and a person of ordinary skill in the art may still derive other drawings from these accompanying drawings without creative efforts.

DETAILED DESCRIPTION

The following clearly describes the technical solutions in the embodiments of the present invention with reference to the accompanying drawings in the embodiments of the present invention. Apparently, the described embodiments are merely apart rather than all of the embodiments of the present invention. All other embodiments obtained by a person of ordinary skill in the art based on the embodiments of the present invention without creative efforts shall fall within the protection scope of the present invention.

Embodiment 1

Figure 1:
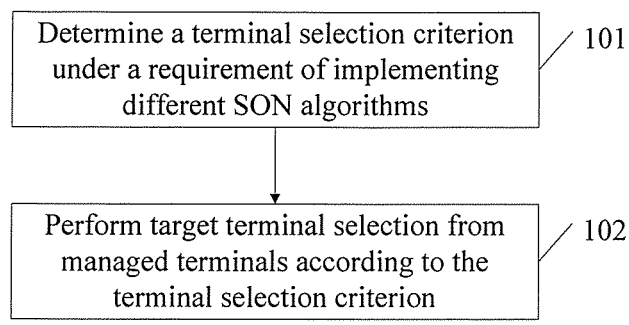
FIG. 1 is a schematic flowchart of a SON-based terminal selection method according to Embodiment 1 of the present invention.

Embodiment 1 of the present invention provides a SON-based terminal selection method, and the method may be executed by a SON algorithm entity. The SON algorithm entity may be a network management system, and may also be a network element device. The network element device may be a core network element, or an access network element, such as a radio network controller (RNC), a NodeB), an evolved NodeB (eNodeB) and another base station obtained by means of evolution. As shown in FIG. 1, the method includes the following contents.

101: Determine a terminal selection criterion under a requirement of implementing different SON algorithms.

As an example, terminal selection criteria may be pre-configured on a SON algorithm entity by an operator under the requirement of implementing different SON algorithms. Correspondingly, the SON algorithm entity may determine, under the requirement of implementing different SON algorithms, a terminal selection criterion specific to the requirement of implementing different SON algorithms, from the pre-configured terminal selection criteria. As another example, the terminal selection criterion may be determined by a SON algorithm entity under the requirement of implementing different SON algorithms.

As an example, the requirement of implementing different SON algorithms includes at least one of the following:
a cell importance degree, an objective fulfillment time limit of a SON algorithm, a cell type, a cell service type, a cell load condition, and an interference-received-by-cell condition.

Specifically, the terminal selection criterion should meet the requirement of implementing different SON algorithms as much as possible. The terminal selection criterion may include the number of target terminals, or a percentage value of target terminals in all terminals in a cell. For example:

(1) Cell importance degree. If an importance degree of a cell is high, it is required that an objective of a SON algorithm be fulfilled in a short time, that is, the objective fulfillment time limit of the SON algorithm is short. When target terminals are selected for the cell, as many target terminals as possible may be selected to participate in the SON algorithm. For example, because an urban cell relates to a large user base, an importance degree of the cell is also high. During cell outage compensation (COC) for the urban cell, the terminal selection criterion may include as many terminals as possible to be used as target terminals. It is assumed that the total number of terminals in the urban cell is 60, and 80% (that is, 48 of 60 terminals) of the terminals may be selected as target terminals. Because a rural cell relates to a small user base, its importance degree is low. In a process of implementing COC, the terminal selection criterion may include a small number of target terminals to participate in implementation of the SON algorithm. For example, it is assumed that the total number of terminals in the rural cell is 30, and 10% (that is, 3 of 30 terminals) of the terminals may be selected as target terminals.

(2) Cell type. The cell type may include macrocell, microcell, picocell and the like. For example, a coverage area of a macrocell is relatively wide, and the terminal selection criterion, in a process of implementing CCO, may include a large number of target terminals that are in different locations. On the contrary, a coverage area of a picocell is relatively small, and the number of terminals accommodated in the picocell is also relatively small, and therefore, the terminal selection criterion may include a small number of terminals, which are used as target terminals and participate in the implementation of the SON algorithm.

(3) Cell service type. The cell service type may include gold service cell, silver service cell, bronze service cell, and the like. Cell services are categorized into multiple service types according to quality requirements of the cell services. For example, a quality of service requirement of a gold service cell is high, and in order not to affect normal services of the gold service cell, it is required that few terminals or no terminal in the gold service cell should be selected.

(4) Cell load condition. For example, for automatic neighbor relationship (ANR), when a load of a cell is high, the number of target terminals in the terminal selection criterion is reduced as much as possible. For load balancing optimization (LBO), however, when the load of the cell is high, the terminal selection criterion may include a large number of target terminals, so as to balance the high load.

(5) Interference-received-by-cell condition. The number of target terminals may be determined according to the interference-received-by-cell condition. The selection criterion under the interference-received-by-cell condition is similar to that under the cell load condition. For example, for ANR, when a cell receives strong interference, the number of target numbers in the terminal selection criterion may be reduced as much as possible, so as not to increase interference to the cell. For LBO, when the cell receives strong interference, a large number of target terminals may be selected in the terminal selection criterion, so as to alleviate the received interference condition.

102: Perform target terminal selection from managed terminals according to the terminal selection criterion.

The SON algorithm entity may select the target terminal from all terminals managed by the SON algorithm entity, and may also select the target terminal from some of the terminals managed by the SON algorithm entity. For example, when the SON algorithm relates to a management scope of a network management system or a network element device, the network management system or the network element device may select appropriate target terminals from all managed terminals. When the SON algorithm relates only to an individual cell managed by the network management system or the network element device, the SON algorithm entity may select some of target terminals from the related individual cell.

In Embodiment 1 of the present invention, the SON algorithm includes but is not limited to: cell outage compensation (COC), automatic neighbor relationship (ANR), capacity and coverage optimization (CCO), load balancing optimization (LBO), mobility robust optimization (MRO), minimization of drive test (MDT), cell outage detection (COD), energy saving (ES), and the like.

A person skilled in the art may understand that terminal selection criteria may be different for a requirement of implementing different SON algorithms; and even for a requirement of implementing a same SON algorithm, terminal selection criteria determined by different SON algorithm entities may also be different.

It needs to be noted that the SON-based terminal selection method provided by Embodiment 1 of the present invention may be applied not only to a Long Term Evolution (LTE) system, but also to wireless communications systems such as a Universal Mobile Telecommunications System (UMTS), and a Global System for Mobile Communications radio access system (GSM EDGE Radio Access Network, GERAN), and this embodiment of the present invention sets no limitation thereon.

In Embodiment 1 of the present invention, to implement different SON algorithms, a SON algorithm entity needs to select target terminals to implement the SON algorithms, which requires consumption of resources of the terminals, especially resources of some terminals that do not need to participate in implementation of the SON algorithms, and therefore may result in excessive resource consumption of these terminals and weaken user experience of these terminals. By applying the technical solution provided by Embodiment 1 of the present invention, a corresponding terminal selection criterion is determined under a requirement of implementing different SON algorithms, and target terminal selection is performed according to the terminal selection criterion, which can not only meet the requirement of implementing the SON algorithms, but also perform target terminal selection pertinently rather than select all terminals managed by the SON algorithm entity as target terminals to participate in implementation of the SON algorithms, thereby reducing waste of resources of terminals.

Embodiment 2

Embodiment 2 of the present invention further elaborates and expands the method provided in Embodiment 1 of the present invention, and the concepts and process in Embodiment 1 of the present invention are applicable to Embodiment 2 of the present invention, which are not further described in Embodiment 2.

Figure 2:
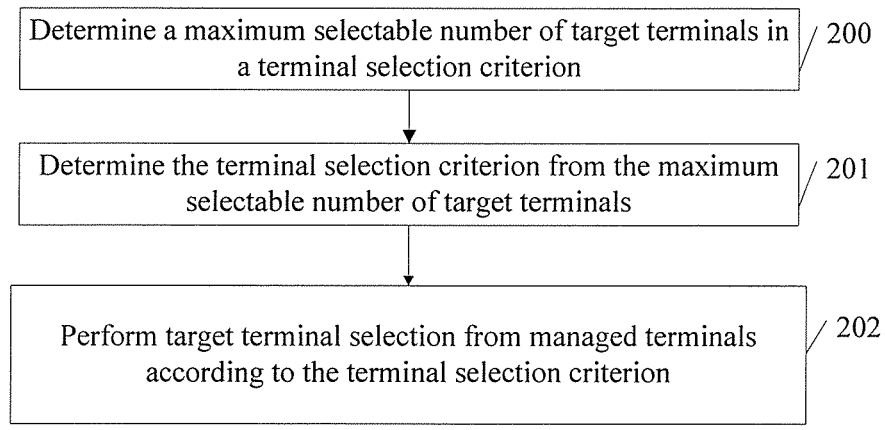
FIG. 2 is a schematic flowchart of another SON-based terminal selection method according to Embodiment 2 of the present invention.

Embodiment 2 of the present invention provides a SON-based terminal selection method, which, as shown in FIG. 2, includes:

201: Determine a terminal selection criterion according to a requirement of implementing different SON algorithms, and/or according to at least one factor of the following, where the at least one factor includes but is not limited to:

a terminal priority, a terminal battery remaining power, a terminal processing speed, a terminal moving speed, a terminal capability, a terminal type, a terminal location, a terminal load, a terminal service type, a quality requirement of terminal service, and random selection.

As an example, for details about the requirement of implementing different SON algorithms, refer to those mentioned in Embodiment 1 of the present invention, and details are not described herein again. A SON algorithm entity may determine, according to the requirement of implementing different SON algorithms, the terminal selection criterion under the requirement of implementing different SON algorithms. For example, the SON algorithm entity may determine the terminal selection criterion according to a cell type, where the cell type includes macrocell, microcell, picocell and the like. Because a coverage area of a macrocell is wide, where there are a large number of target terminals that are in different locations, the terminal selection criterion determined by the SON algorithm entity may indicate that terminals in the macrocell are selected preferentially as target terminals to participate in implementation of a SON algorithm. If terminals in the macrocell are inadequate to meet a requirement of implementing the SON algorithm, a terminal in a microcell or a picocell may be selected. For another example, the SON algorithm entity may determine the terminal selection criterion according to a cell service type, where the cell service type includes gold service cell, silver service cell, and bronze service cell. Because a gold service cell requires high service quality, in order not to affect normal services of the gold service cell, the terminal selection criterion may indicate that some or all terminals in a silver service cell or a bronze service cell are selected preferentially.

As an example, in Embodiment 2 of the present invention, the SON algorithm entity may determine the terminal selection criterion according to only one or a combination of the foregoing factors, which specifically includes:

(1) Terminal priority. In order not to affect service communication of terminals with high priorities, terminals may be selected as target terminals in an ascending order of priorities. In this way, the terminal selection criterion may indicate that these high-priority terminals do not need to participate in implementation of a SON algorithm, and the SON algorithm entity does not select these high-priority terminals as target terminals, which does not cause a problem of excessive resource consumption of these high-priority terminals and does not weaken user experience of these high-priority terminals.

(2) Terminal battery remaining power. To reduce electricity consumption to prevent a terminal from being incapable of normal communication due to exhaustion of battery, terminals may be selected as target terminals in a descending order of remaining battery power. In this way, the terminal selection criterion may indicate that terminals with inadequate remaining battery power do not need to participate in implementation of a SON algorithm, and the SON algorithm entity does not select these terminals as target terminals, thereby saving electricity of these terminals with inadequate remaining battery power so as to support service communication.

(3) Terminal processing speed. The terminal processing speed may be determined by resources and performance of a terminal, such as a processing capability of a terminal processor (for example, a central processing unit or another embedded chip) and a memory size. To increase an implementation speed of a SON algorithm, the terminal selection criterion may indicate that terminals with high processing speeds are selected preferentially and terminals are selected as target terminals in a descending order of processing speeds.

(4) Terminal moving speed. Because terminals are located in different geographic locations, detection information about corresponding geographic locations can be provided. Therefore, the terminal selection criterion may also be determined according to the terminal moving speed. For example, for ANR or CCO, the terminal selection criterion may indicate that terminals with high moving speeds are selected preferentially so as to acquire detection results for different locations as soon as possible, thereby fulfilling an objective of the SON algorithm as soon as possible.

(5) Terminal capability. The terminal capability includes a capability of supporting a global positioning system (GPS), a capability of supporting the third generation (3G)

mobile communications networks, and a capability of supporting implementation of a SON algorithm, and the like. For example, during implementation of CCO, terminals in different locations need to be utilized to report signal quality measurement results that carry location information. Therefore, for CCO, the terminal selection criterion may indicate that terminals that have a GPS capability and support a function of minimization of drive test (MDT) are selected preferentially as target terminals. To fulfill the objective of the SON algorithm quickly, the terminal selection criterion may also indicate that terminals supporting multiple input multiple output (MIMO) are selected preferentially. To implement ANR, the terminal selection criterion may also indicate that terminals supporting ANR need to be selected.

(6) Terminal type. The terminal type may include data card terminal with Internet access, ordinary mobile phone terminal, tablet computer terminal, and the like. For example, during implementation of ANR, to discover a possible neighbor cell as soon as possible, the terminal selection criterion may indicate that ordinary mobile phone terminals with good mobility are selected preferentially.

(7) Terminal location. The terminal location may include cell edge, cell overlap area, cell center, and the like. For example, to implement high-precision optimization of CCO, the terminal selection criterion may indicate that terminals in different locations of a cell (for example, cell edge, or cell center, or cell overlap area) are selected.

(8) Terminal load. To support some particular SON algorithms, a target terminal needs to do extra detection and reporting work, which increases a load of the target terminal. For example, during implementation of ANR, the terminal selection criterion may indicate that low-load terminals are selected preferentially in an ascending order of loads. For LBO, however, to reduce a cell load as soon as possible, the terminal selection criterion may indicate that high-load terminals in a high-load cell are selected preferentially as target terminals, so as to quickly achieve load balancing between cells.

(9) Terminal service type. The terminal service type may include guaranteed bit rate (GBR) service, non-guaranteed bit rate (nonGBR) service, and the like. The terminal selection criterion may indicate terminals of which terminal service type are selected as target terminals according to a requirement of implementing different SON algorithms.

(10) Terminal quality of service requirement. For example, a quality of service class identifier (QCI) corresponding to a terminal service. The terminal selection criterion may indicate that low-QCI terminals are selected preferentially as target terminals by using the QCI as a basis, thereby avoiding impact on a high-QCI terminal service.

(11) Random selection. The terminal selection criterion may also indicate that a random selection method is used to randomly select an appropriate number of target terminals from terminals managed by a network entity or randomly select an appropriate number of target terminals from a cell on which a SON algorithm is performed.

Optionally, in Embodiment 2 of the present invention, if it is determined, according to any one of the foregoing factors (including but not limited to (1) to (10)), that a terminal should not be used as a target terminal, the terminal selection criterion may indicate that the terminal is not to be used as a target terminal.

As another example, the SON algorithm entity may determine the terminal selection criterion according to the requirement of implementing different SON algorithms and one or a combination of the foregoing factors. For example, the SON algorithm entity may preferentially select terminals in a macrocell according to the cell type, and then select, from the terminals in the macrocell and according to the terminal battery remaining power, a terminal that has remaining battery power more than 20% of a rated battery power as a target terminal. For another example, the SON algorithm entity may also select, according to the cell importance degree, a large number of terminals from a cell with a high importance degree (such as an urban cell), and select, according to the terminal capability, a terminal that supports implementation of a SON algorithm from the urban cell as a target terminal.

A person skilled in the art may understand that a terminal may report one or a combination of the foregoing factors to the SON algorithm entity before the terminal selection criterion is determined, so that the SON algorithm entity can determine the terminal selection criterion under the requirement of implementing different SON algorithms. For example, the SON algorithm entity may send indication information to a terminal to request the terminal to report one or a combination of the foregoing factors; or, a terminal may also proactively report one or a combination of the foregoing factors in a current network to the SON algorithm entity when the terminal accesses the network or is idle, or in a periodical reporting manner, or the like manner.

202: Perform target terminal selection from managed terminals according to the terminal selection criterion.

The terminal selection criterion includes, among managed terminals of a SON algorithm entity, which terminals that the SON algorithm entity may select as target terminals to implement a SON algorithm, and which terminals that the SON algorithm entity may not select as target terminals to implement the SON algorithm. Because the terminal selection criterion is determined under the requirement of implementing different SON algorithms, the terminal selection criterion may be different under different requirements of implementing different SON algorithms, and target terminals selected according to the terminal selection criterion may also be different.

It needs to be noted that, in Embodiment 2 of the present invention, determination of the terminal selection criterion according to one or a combination of the foregoing factors is performed in the case of a maximum selectable number of target terminals determined under the requirement of implementing different SON algorithms. Therefore, the number of target terminals selected from the managed terminals according to the terminal selection criterion may be the maximum selectable number of target terminals, and may also not reach the maximum selectable number of target terminals, or even no terminal is selected. For example, implementation of a SON algorithm requires selecting as many target terminals as possible while current power of the terminals managed by the SON algorithm entity are all low, to ensure that user experience of the terminals is not weakened (for example, a terminal is quickly running low in power because the terminal participates in the implementation of the SON algorithm and is powered off), in this case, it is very likely that no target terminal is selected. The SON algorithm entity may wait and execute the SON algorithm when a terminal with an adequate power becomes a terminal managed by the SON algorithm entity. For another example, implementation of a SON algorithm requires selecting as many target terminals as possible but none of terminals managed by the SON algorithm entity in a current network has a capability of supporting the implementation of the SON algorithm. Therefore, the number of actually selected target terminals may be 0, which also indicates the current network is not suitable for the implementation of the SON algorithm.

In the method according to Embodiment 2 of the present invention, after the SON algorithm entity selects a target terminal, because different SON algorithms require different data, the target terminal may, according to the requirement of implementing the SON algorithms, perform detection and report data (for example, signal quality) or perform related network operations (such as handover or redirecting). For example, for COC and ANR, the target terminal may detect information such as an unknown physical cell identity (PCI) and global cell identity (GCI), and then report the information to the SON algorithm entity, so that the SON algorithm entity discovers a newly added neighbor relationship. For CCO, the target terminal may detect network signal quality in the location of the target terminal, and then report a result to the SON algorithm entity, so that the SON algorithm entity (such as a base station) adjusts a baseband or radio frequency policy, and optimizes a signal coverage condition.

In Embodiment 2 of the present invention, to implement different SON algorithms, the SON algorithm entity needs to select target terminals so as to implement the SON algorithms, which requires consumption of resources of the terminals, especially resources of some terminals that do not need to participate in implementation of the SON algorithms, and therefore may result in excessive resource consumption of these terminals, and weaken user experience of these terminals. By applying the technical solution provided by Embodiment 2 of the present invention, a corresponding terminal selection criterion is determined under a requirement of implementing different SON algorithms, and target terminal selection is performed according to the terminal selection criterion, which can not only meet the requirement of implementing the SON algorithms, but also perform target terminal selection pertinently rather than select all terminals managed by the SON algorithm entity as target terminals to participate in implementation of the SON algorithms, thereby reducing waste of resources of terminals.

Further, by applying the method for determining a terminal selection criterion described in Embodiment 2 of the present invention, a SON algorithm entity can, under a requirement of implementing different SON algorithms, perform target terminal selection under different factors for determining a terminal selection criterion, thereby improving the pertinence of target terminal selection.

Embodiment 3

To help a person skilled in the art understand an implementation method of the embodiments of the present invention, the following describes a terminal selection method with reference to specific SON algorithms.

COC and ANR

Figure 3:
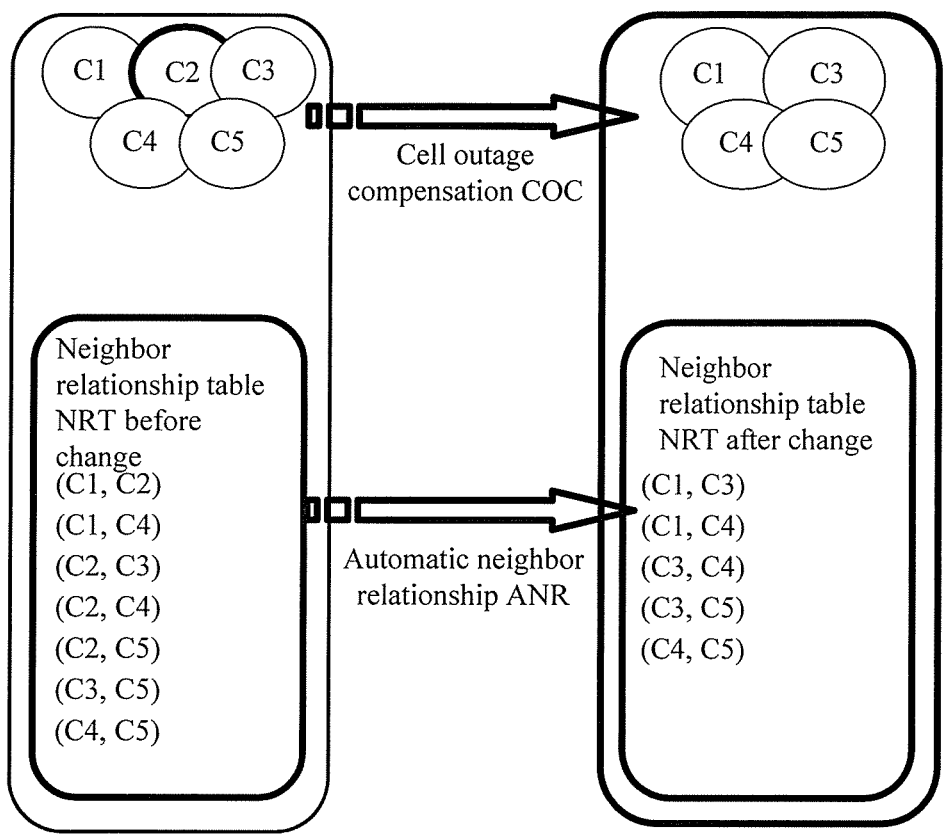
FIG. 3 is a schematic diagram of an implementation scene based on COC and ANR according to Embodiment 3 of the present invention.

In a case of cell outage, COC may compensate a cell in outage by means of radio frequency reconfiguration and the like, for example, by adding a temporary cell, or changing antenna parameters of neighbor cells around the cell in outage (for example, adjusting a tilt angle or transmit power of an antenna in a neighbor cell). After the cell in outage is compensated, neighbor relationships are changed correspondingly, and the changed neighbor relationships are discovered by means of ANR, so that neighbor relationships are updated in a network element device and an OAM. For example, as shown in FIG. 3, because cell outage occurs in a cell C2, after COC is used to make neighbor cells (for example, cells C1, C3, C4, and C5) compensate the cell C2 in outage, the neighbor relationships are changed. The changed neighbor relationships include newly added neighbor relationships (C1, C3) and (C3, C4).

Therefore, ANR needs to use the following terminal selection criterion to select an appropriate number of target terminals, and use the selected target terminals to report an unknown PCI and GCI information of the unknown PCI, so as to update a neighbor relationship table.

(1) Determine selectable terminals according to a SON algorithm implementation requirement such as an importance degree of the cell C2 in outage.

If the importance degree of the cell C2 in outage is high, for example, C2 is an urban cell, a large number of terminals that support an ANR function may be selected as target terminals, for example 80% or 100% terminals supporting the ANR function in a neighbor cell, so as to discover a changed neighbor relationship as soon as possible. In particular, it is assumed that a rated number of target terminals required for the cell C2 in outage to implement ANR is preset to 80, and the number of accessed terminals that support the ANR function in a management scope of a network entity is only 50, thus as many terminals that support the ANR function as possible in the management scope may be selected as target terminals, to provide support for ANR.

If the importance degree of the cell C2 in outage is low, for example, C2 is a remote rural cell, a small number of terminals that support the ANR function are selected as target terminals.

(2) Select target terminals from the selectable terminals to participate in a neighbor relationship discovery process of ANR.

Among the selectable terminals, terminals are selected in an ascending order of priorities until the number of terminals meets the SON algorithm implementation requirement; or, if the number of terminals in a neighbor cell is limited, as many terminals as possible are selected as target terminals, so as to meet the SON algorithm implementation requirement as much as possible. A result of the foregoing selection methods is that only terminals with relatively low priorities are required to participate in ANR. For example, a terminal of a gold user is not selected and a terminal with a high QoS service class is not selected either.

If priorities of multiple terminals are the same, target terminals may be selected from these terminals with a same priority in a descending order of remaining battery power; or an appropriate number of target terminals are selected from these terminals with a same priority by using a random selection method, until the number of selected target terminals meets the SON algorithm implementation requirement or meets the SON algorithm implementation requirement as much as possible.

CCO

For capacity and coverage optimization, CCO may perform minimization of drive test (Minimization of Drive Test, MDT) by using a terminal. The CCO acquires signal coverage conditions in different locations in a network by using a measurement result that carries location information and is reported by the target terminal. To achieve the objective, CCO selects proper target terminals according to the following terminal selection criterion, and performs MDT by using these selected target terminals.

(1) Firstly, selectable terminals under the SON algorithm implementation requirement may be determined according to a SON algorithm implementation requirement such as a time limit required by CCO.

If the time limit of capacity and coverage optimization for an area to be optimized requires completion in a time as short as possible, as many terminals as possible may be selected to perform MDT, for example, 80% or 100% terminals. However, an actual situation may be that an actual number of target terminals possibly selectable by a SON algorithm entity is inadequate, for example, there are actually not adequate target terminals in a cell to meet the SON algorithm implementation requirement. In this case, target terminals that meet the SON algorithm implementation requirement should be selected as much as possible.

(2) To match the time limit requirement of CCO, target terminals may be selected from the selectable terminals according to the following terminal selection criterion.

Terminals with high processing speeds and a GPS capability are selected preferentially in a descending order of terminal processing speeds and according to terminal GPS capabilities, so as to acquire more accurate geographic location information and complete MDT data collection for the network as soon as possible.

If all or a majority of terminals have a same processing speed and a GPS capability, terminals may be selected in a descending order of remaining battery power, and terminals with high remaining battery power are selected preferentially to participate in CCO, or an appropriate number of target terminals are randomly selected from the terminals with the same processing speed and the GPS capability.

LBO

For load balancing optimization, LBO may select some target terminals to perform inter-cell handover, so as to achieving load balancing between cells. Therefore, LBO may use the following terminal selection method to select suitable target terminals to perform LBO.

(1) Firstly, selectable terminals may be determined according to a SON algorithm implementation requirement such as an emergency condition of LBO.

If an optimization objective of a area to be load-balanced requires completion in a time as short as possible, as many terminals as possible may be selected to perform LBO, for example, 80% or 100% terminals.

(2) To support the emergency requirement of LBO, target terminals may be selected from the selectable terminals in a descending order of loads. In this way, only terminals with relatively high loads are selected to perform handover and redirecting, thereby effectively meeting a load balancing requirement between cells, and reducing the number of terminals for handover.

Alternatively, terminals are selected in a descending order of priorities. In this way, only terminals with relatively low priorities are handed over. For example, terminals of gold users do not need inter-cell handover, and terminals with high QoS service classes do not need inter-cell handover either.

If all or a majority of terminals have a same priority or a same load, an appropriate number of terminals may be selected in a descending order of remaining battery power, or an appropriate number of target terminals are randomly selected from the terminals with the same priority or same load to perform inter-cell handover.

It needs to be noted that this embodiment of the present invention only lists terminal selection methods in implementation processes of a few SON algorithms, and the method of the present invention is also applicable to other SON algorithms and SON functions that are not listed in the specification. With the method of the present invention, persons skilled in the art can implement terminal selection methods based on other SON algorithms without creative efforts, which, although not listed, still fall within the protection scope of the present invention.

In the SON-based terminal selection method provided by this embodiment of the present invention, a different terminal selection criterion is preset specific to different SON algorithms, which can determine, according to different application scenarios, a terminal selection criterion under a requirement of implementing different SON algorithms while meeting the requirement of implementing the SON algorithms.

Embodiment 4

Embodiment 4 of the present invention provides a network entity, and the network entity provided by Embodiment 4 of the present invention corresponds to the method embodiment according to any one of Embodiments 1 to 3 of the present invention. The concepts and processes described in the method embodiments are applicable to Embodiment 4 of the present invention, and refer to the method embodiments for details which are not described herein again.

Figure 4:
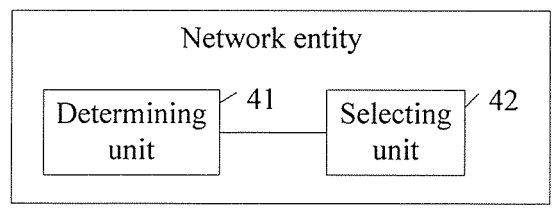
FIG. 4 is a composition diagram of a network entity according to Embodiment 4 of the present invention.

As shown in FIG. 4, the network entity may include a determining unit 31 and a selecting unit 32.

The determining unit 31 is configured to determine a terminal selection criterion under a requirement of implementing different SON algorithms.

The selecting unit 32 is configured to perform target terminal selection from managed terminals according to the terminal selection criterion determined by the determining unit 31.

Optionally, the requirement of implementing different SON algorithms includes but is not limited to at least one of the following: a cell importance degree, an objective fulfillment time limit of a SON algorithm, a cell type, a cell service type, a cell load condition, and an interference-received-by-cell condition.

Optionally, the determining unit is configured to determine the terminal selection criterion according to the requirement of implementing different SON algorithms, and/or according to at least one factor of the following, where the at least one factor includes:

a terminal priority, a terminal battery remaining power, a terminal processing speed, a terminal moving speed, a terminal capability, a terminal type, a terminal location, a terminal load, a terminal service type, a quality requirement of terminal service, and random selection.

Optionally, the SON algorithm includes but is not limited to at least one of the following: cell outage compensation (COC), automatic neighbor relationship (ANR), capacity and coverage optimization (CCO), load balancing optimization (LBO), mobility robust optimization (MRO), minimization of drive test (MDT), cell outage detection (COD), energy saving (ES), and the like.

Optionally, the network entity may include a network management system OAM, and/or a network element device (for example, a base station, a repeater, a core network device or a user terminal).

As an example, the network entity provided by Embodiment 4 of the present invention may be a network management system, and may also be a network element device. The network element device may include a core network element, or an access network element, such as a radio network controller (RNC), a NodeB, an evolved NodeB (NodeB) and another base station obtained by means of evolution.

By applying the technical solution provided by Embodiment 4 of the present invention, a corresponding terminal selection criterion is determined under a requirement of implementing different SON algorithms, and target terminal selection is performed according to the terminal selection criterion, which can not only meet the requirement of implementing the SON algorithms, but also perform target terminal selection pertinently rather than select all terminals managed by the SON algorithm entity as target terminals to participate in implementation of the SON algorithms, thereby reducing waste of resources of terminals.

Embodiment 5

Figure 5:
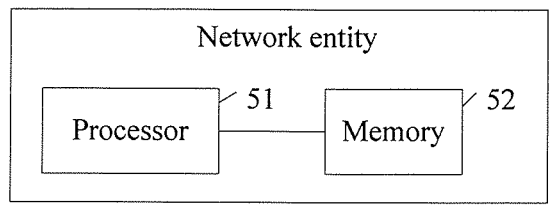
FIG. 5 is a composition diagram of another network entity according to Embodiment 5 of the present invention.

Embodiment 5 of the present invention provides a network entity. As shown in FIG. 5, the network entity includes a processor 51 and a memory 52. The memory 52 is configured to store computer-executable program code, and the processor 51 is configured to execute the program code stored in the memory 52, so as to implement the following method:

determining a terminal selection criterion under a requirement of implementing different SON algorithms; and performing target terminal selection from managed terminals according to the terminal selection criterion.

As an example, the requirement of implementing different SON algorithms includes but is not limited to at least one of the following:

a cell importance degree, an objective fulfillment time limit of a SON algorithm, a cell type, a cell service type, a cell load condition, and an interference-received-by-cell condition.

As an example, the determining a terminal selection criterion under a requirement of implementing different SON algorithms may include:

determining the terminal selection criterion according to the requirement of implementing different SON algorithms, and/or according to at least one factor of the following, where the at least one factor includes:

a terminal priority, a terminal battery remaining power, a terminal processing speed, a terminal moving speed, a terminal capability, a terminal type, a terminal location, a terminal load, a terminal service type, a quality requirement of terminal service, and random selection.

As an example, the processor 51 may be a central processing unit (CPU), a digital signal processor (DSP) or a field-programmable gate array (FPGA).

By applying the technical solution provided by Embodiment 5 of the present invention, a corresponding terminal selection criterion is determined under a requirement of implementing different SON algorithms, and target terminal selection is performed according to the terminal selection criterion, which can not only meet the requirement of implementing the SON algorithms, but also perform target terminal selection pertinently rather than select all terminals managed by the SON algorithm entity as target terminals to participate in implementation of the SON algorithms, thereby reducing waste of resources of terminals.

Embodiment 6

Figure 6:
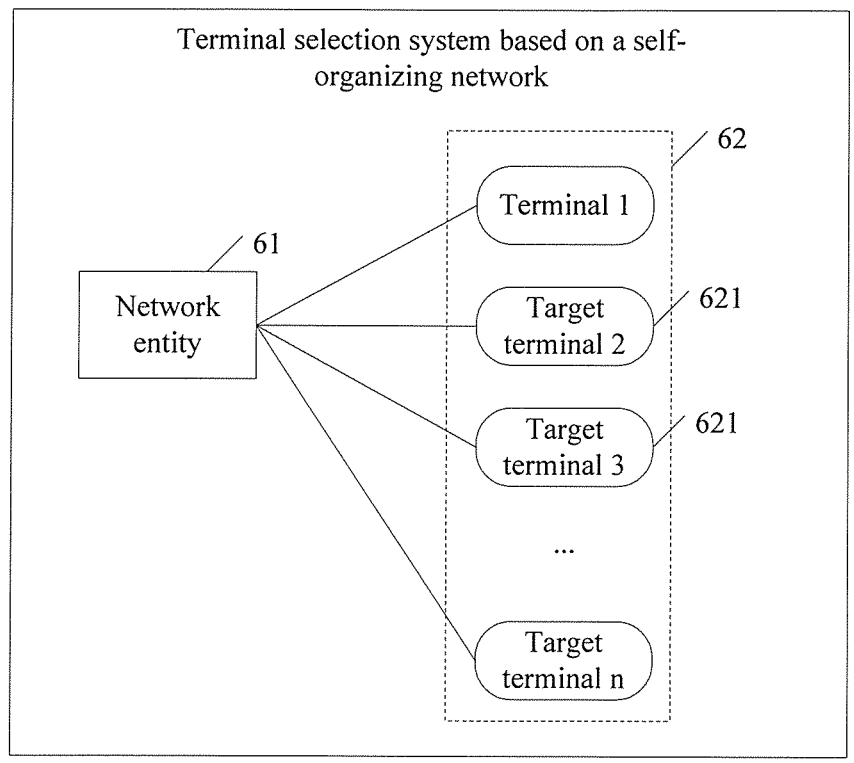
FIG. 6 is a composition diagram of a SON-based terminal selection system according to Embodiment 6 of the present invention.

Embodiment 6 of the present invention further provides a SON-based terminal selection system, which, as shown in FIG. 6, includes a network entity 61, and at least one terminal 62 managed by the network entity 61.

The network entity 61 is configured to determine a terminal selection criterion under a requirement of implementing different SON algorithms. The network entity 61 is further configured to perform target terminal selection from managed terminals according to the terminal selection criterion.

The terminal 62 is configured to provide data required by a SON algorithm to the network entity 61, or participate in an operation required by implementation of the SON algorithm.

There may be a plurality of terminals 62 that access the network entity 61. In FIG. 5, for example, there are n terminals 62 managed by the network entity (n is an integer greater than or equal to 1), while only some of the n terminals 62 are selected as target terminals 621, so that target terminal selection is pertinent, which can save resources of terminals that do not need to participate in implementation of the SON algorithm, and does not weaken user experience of these terminals.

By applying the technical solution provided by Embodiment 6 of the present invention, a corresponding terminal selection criterion is determined under a requirement of implementing different SON algorithms, and target terminal selection is performed according to the terminal selection criterion, which can not only meet the requirement of implementing the SON algorithms, but also perform target terminal selection pertinently rather than select all terminals managed by the SON algorithm entity as target terminals to participate in implementation of the SON algorithms, thereby reducing waste of resources of terminals.

Based on the foregoing descriptions of the implementation manners, a person skilled in the art may clearly understand that the present invention may be implemented by software in addition to a necessary universal hardware or by hardware only. Inmost circumstances, the former is a preferred implementation manner. Based on such an understanding, the technical solutions of the present invention essentially or the part contributing to the prior art may be implemented in a form of a software product. The software product is stored in a readable storage medium, such as a floppy disk, a hard disk or an optical disc of a computer, and includes several instructions for instructing a computer device (which may be a personal computer, a server, or a network device) to perform the methods described in the embodiments of the present invention.

The foregoing descriptions are merely specific implementation manners of the present invention, but are not intended to limit the protection scope of the present invention. Any variation or replacement readily figured out by persons skilled in the art within the technical scope disclosed in the present invention shall fall within the protection scope of the present invention. Therefore, the protection scope of the present invention shall be subject to the protection scope of the claims.

What is claimed is:

1. A terminal selection method based on a self-organizing network (SON), the method comprising:
    determining, by a SON algorithm entity, a terminal selection criterion under a requirement of implementing different SON algorithms;
    performing, by the SON algorithm entity, target terminal selection from terminals managed by the SON algorithm entity according to the terminal selection criterion; and
    wherein the terminal selection criterion indicates that a random selection method is used to randomly select a number of target terminals from terminals managed by the SON algorithm entity or randomly select a number of target terminals from a cell on which a SON algorithm is performed.

2. The method according to claim 1, wherein determining, by a SON algorithm entity, a terminal selection criterion under a requirement of implementing different SON algorithms comprises:
  determining the terminal selection criterion according to the requirement of implementing different SON algorithms, wherein the requirement of implementing different SON algorithms comprises at least one of the following:
    a cell importance degree, an objective fulfillment time limit of a SON algorithm, a cell type, a cell service type, a cell load condition, and an interference-received-by-cell condition.

3. The method according to claim 2, wherein determining the terminal selection criterion comprises:
  indicating terminals in a cell are selected preferentially as target terminals to participate in implementation of a SON algorithm, wherein the cell is determined by the requirement of implementing different SON algorithms.

4. The method according to claim 1, wherein determining, by a SON algorithm entity, a terminal selection criterion under a requirement of implementing different SON algorithms comprises:
  determining the terminal selection criterion according to at least one factor of the following:
    a terminal priority, a terminal battery remaining power, a terminal processing speed, a terminal moving speed, a terminal capability, a terminal type, a terminal location, a terminal load, a terminal service type, a quality requirement of terminal service.

5. The method according to claim 1, wherein determining, by a SON algorithm entity, a terminal selection criterion under a requirement of implementing different SON algorithms comprises:
  determining the terminal selection criterion according to a requirement of implementing different SON algorithms, and according to at least one factor,
  wherein the requirement of implementing different SON algorithms comprises at least one of the following:
    a cell importance degree, an objective fulfillment time limit of a SON algorithm, a cell type, a cell service type, a cell load condition, and an interference-received-by-cell condition, and
  wherein the at least one factor comprises:
    a terminal priority, a terminal battery remaining power, a terminal processing speed, a terminal moving speed, a terminal capability, a terminal type, a terminal location, a terminal load, a terminal service type, a quality requirement of terminal service.

6. The method according to claim 1, wherein the terminal selection criterion is for selecting a number of the target terminals, or a percentage value of the target terminals in all terminals in a cell.

7. The method according to claim 1, wherein the SON algorithm entity is a network management system, or a core network element, or an access network element.

8. A network entity, comprising:
  a processor;
  memory coupled to the processor, the memory comprising instructions that, when executed by the processor, cause the network entity to:
    determine a terminal selection criterion under a requirement of implementing different self-organizing network (SON) algorithms, and
    perform target terminal selection from terminals managed by the network entity according to the terminal selection criterion; and
  wherein the terminal selection criterion indicates that a random selection method is used to randomly select a number of target terminals from terminals managed by the SON algorithm entity or randomly select a number of target terminals from a cell on which a SON algorithm is performed.

9. The network entity according to claim 8, wherein the memory further comprises instructions that, when executed by the processor, cause the network entity to:
  determine the terminal selection criterion according to the requirement of implementing different SON algorithms, wherein the requirement of implementing different SON algorithms comprises at least one of the following:
    a cell importance degree, an objective fulfillment time limit of a SON algorithm, a cell type, a cell service type, a cell load condition, and an interference-received-by-cell condition.

10. The network entity according to claim 9, wherein the memory further comprises instructions that when executed by the processor, cause the network entity to:
  indicate terminals in a cell are selected preferentially as target terminals to participate in implementation of a SON algorithm, wherein the cell is determined by the requirement of implementing different SON algorithms.

11. The network entity according to claim 8, wherein the memory further comprises instructions that, when executed by the processor, cause the network entity to:
  determine the terminal selection criterion according to at least one factor of the following:
    a terminal priority, a terminal battery remaining power, a terminal processing speed, a terminal moving speed, a terminal capability, a terminal type, a terminal location, a terminal load, a terminal service type, a quality requirement of terminal service.

12. The network entity according to claim 8, wherein the memory further comprises instructions that, when executed by the processor, cause the network entity to:
  determine the terminal selection criterion according to a requirement of implementing different SON algorithms, and according to at least one factor,
  wherein the requirement of implementing different SON algorithms comprises at least one of the following:
    a cell importance degree, an objective fulfillment time limit of a SON algorithm, a cell type, a cell service type, a cell load condition, and an interference-received-by-cell condition, and
  wherein the at least one factor comprises:
    a terminal priority, a terminal battery remaining power, a terminal processing speed, a terminal moving speed, a terminal capability, a terminal type, a terminal location, a terminal load, a terminal service type, a quality requirement of terminal service.

13. The network entity according to claim 8, wherein the terminal selection criterion is for selecting a number of the target terminals, or a percentage value of the target terminals in all terminals in a cell.

14. The network entity according to claim 8, wherein the SON algorithm entity is a network management system, or a core network element, or an access network element.

15. A terminal selection system based on a self-organizing network (SON), comprising:
   a network entity, and at least one terminal managed by the network entity; and
   wherein the network entity comprises:
      a processor;
      memory coupled to the processor, the memory comprising instructions that, when executed by the processor, cause the network entity to:
         determine a terminal selection criterion under a requirement of implementing different self-organizing network (SON) algorithms, and
         perform target terminal selection from managed terminals according to the terminal selection criterion, wherein the terminal selection criterion comprises a number of the target terminal, or a percentage value of the target terminal in all terminals in a cell; and
      wherein the terminal selection criterion indicates that a random selection method is used to randomly select a number of target terminals from terminals managed by the SON algorithm entity or randomly select a number of target terminals from a cell on which a SON algorithm is performed.

* * * * *